(12) United States Patent
Griggs

(10) Patent No.: US 8,882,968 B1
(45) Date of Patent: Nov. 11, 2014

(54) METHOD AND APPARATUS FOR SOLAR DESALINATION

(76) Inventor: Robert L. Griggs, Birmingham, AL (US)

( * ) Notice: Subject to any disclaimer, the term of this patent is extended or adjusted under 35 U.S.C. 154(b) by 126 days.

(21) Appl. No.: 13/529,705

(22) Filed: Jun. 21, 2012

(51) Int. Cl.
*B01D 1/00* (2006.01)
*C02F 1/14* (2006.01)

(52) U.S. Cl.
CPC ............ *B01D 1/0035* (2013.01); *B01D 1/0082* (2013.01); *C02F 1/14* (2013.01)
USPC .................................................. 203/10; 203/4

(58) Field of Classification Search
None
See application file for complete search history.

(56) References Cited

U.S. PATENT DOCUMENTS

| | | | |
|---|---|---|---|
| 3,965,683 A * | 6/1976 | Dix ............................ | 60/641.15 |
| 4,148,300 A | 4/1979 | Kaufman, Sr. | |
| 4,343,683 A * | 8/1982 | Diggs ............................... | 203/2 |
| 4,471,619 A * | 9/1984 | Nolley, Jr. ...................... | 60/648 |
| 4,504,362 A | 3/1985 | Kruse | |
| 5,622,605 A | 4/1997 | Simpson et al. | |
| 6,062,029 A | 5/2000 | Doe | |
| 6,301,893 B1 | 10/2001 | Luo | |
| 7,168,252 B1 | 1/2007 | Price | |
| 2010/0275599 A1 * | 11/2010 | Glynn ........................... | 60/641.9 |

* cited by examiner

*Primary Examiner* — Nina Bhat
*Assistant Examiner* — Brandi M Doyle
(74) *Attorney, Agent, or Firm* — George L Williamson

(57) ABSTRACT

Method and apparatus for desalinization wherein a heating grid containing a fluid is used to heat the fluid to a vaporized state using energy provided by compound magnifying lens focusing solar energy directly onto the grid wherein the vapor from the grid system is transmitted to a steam turbine wherein electricity is generated to charge a battery while the vapor from the steam turbine is conducted to a condenser wherein the vapor is cooled and fresh water is provided from the condensate. The remaining fluid from the condenser is pumped back into a reservoir for storage while waiting to be conducted into the heating grid. The magnifying lens and grid is rotated for alignment with the sun.

8 Claims, 3 Drawing Sheets

METHOD AND APPARATUS FOR SOLAR DESALINATION

BACKGROUND OP THE INVENTION

1. Field of the Invention

The present invention relates generally to desalinization and, more particularly, is a method and apparatus for desalinating salt water and generate electricity using solar energy.

2. Description of the Related Art

Desalinization or related units have been described in the related art, however, none of the related art devices disclose the unique features of the present invention.

In U.S. Pat. No. 7,168,252 dated Jan. 30, 2007, Price disclosed a solar heated generator. In U.S. Patent Application Publication No. 2010/0275599 dated Nov. 4, 2010, Glynn disclosed a solar desalinization system. In U.S. Pat. No. 5,622,605 dated Apr. 22, 1997, Simpson, et al., disclosed a process for desalinating water by producing power. In U.S. Pat. No. 4,148,300 dated Apr. 10, 1979, Kaufman, Sr., disclosed a solar radiation energy concentrator. In U.S. Pat. No. 4,504,362 dated Mar. 12, 1985, Kruse disclosed a solar desalination system and method. In U.S. Pat. No. 3,965,683 dated Jun. 29, 1976, Dix disclosed a solar electrical generating system. In U.S. Pat. No. 6,062,029 dated May 16, 2000, Doe disclosed an optical solar electric generator. In U.S. Pat. No. 6,301,893 dated Oct. 16, 2001, Luo disclosed a method and apparatus for converting natural heat energy into another form of energy.

While these desalinization methods and energy generation methods may be suitable for the purposes for which they were designed, they would not be as suitable for the purposes of the present invention as hereinafter described.

SUMMARY OF THE PRESENT INVENTION

The present invention discloses a desalinization system wherein a heating grid containing a fluid, e.g., salt water, contaminated water or the like, is used to heat the internal fluid to a vaporized state using energy provided by at least one large magnifying lens, expected to be 15 to 20 feet in diameter and which may be a compound magnifying lens, focusing concentrated sunlight energy directly onto the grid wherein the vapor from the grid system is transmitted to a steam turbine wherein electricity is generated to charge a battery, e.g., a 250 volt battery, while the vapor from the steam turbine is conducted to a condenser wherein the vapor is cooled and clean fresh water is provided from the condensate. The remaining fluid, e.g., salt water, from the condenser is pumped back into a reservoir for storage while waiting to be conducted into the steam heating grid made of Pyrex glass or coming ware glass or metal about two inch in diameter and about ¼ inch thick. A source of suitable fluid, e.g., salt water, is provided to the pump for pumping necessary supply fluid into the storage reservoir. The entire generating system is mounted on an effectively sized platform which rotates in a 360 degree path which allows the magnifying lens to constantly receive maximum energy from the sun capable of rotating backwardly 180 degrees as the sun changes angle during the day or as the sun goes down. The rotating platform is driven by a motor which receives energy from the battery.

An object of the present invention is to desalinate, e.g., salt water. A further object of the present invention is to provide a fresh supply from a salt water source of water. A further object of the present invention is to utilize solar energy in order to heat the salt water to a vaporized or steam state. A further object of the present invention is to provide a system which rotates so as to always maintain the highest possible efficiency while receiving solar energy from the sun. A further object of the present invention is to provide a means for generating electricity which can be used to charge a battery which can likewise be used to furnish electricity to the pump used in the system and to likewise furnish electricity to a motor which turns the platform upon which the system is mounted can likewise be used to furnish electricity to light and power a house for up to 48 hours. A further object of the present invention is to provide a system which can be relatively easily operated by a user. A further object of the present invention is to provide a system can be relatively inexpensively manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
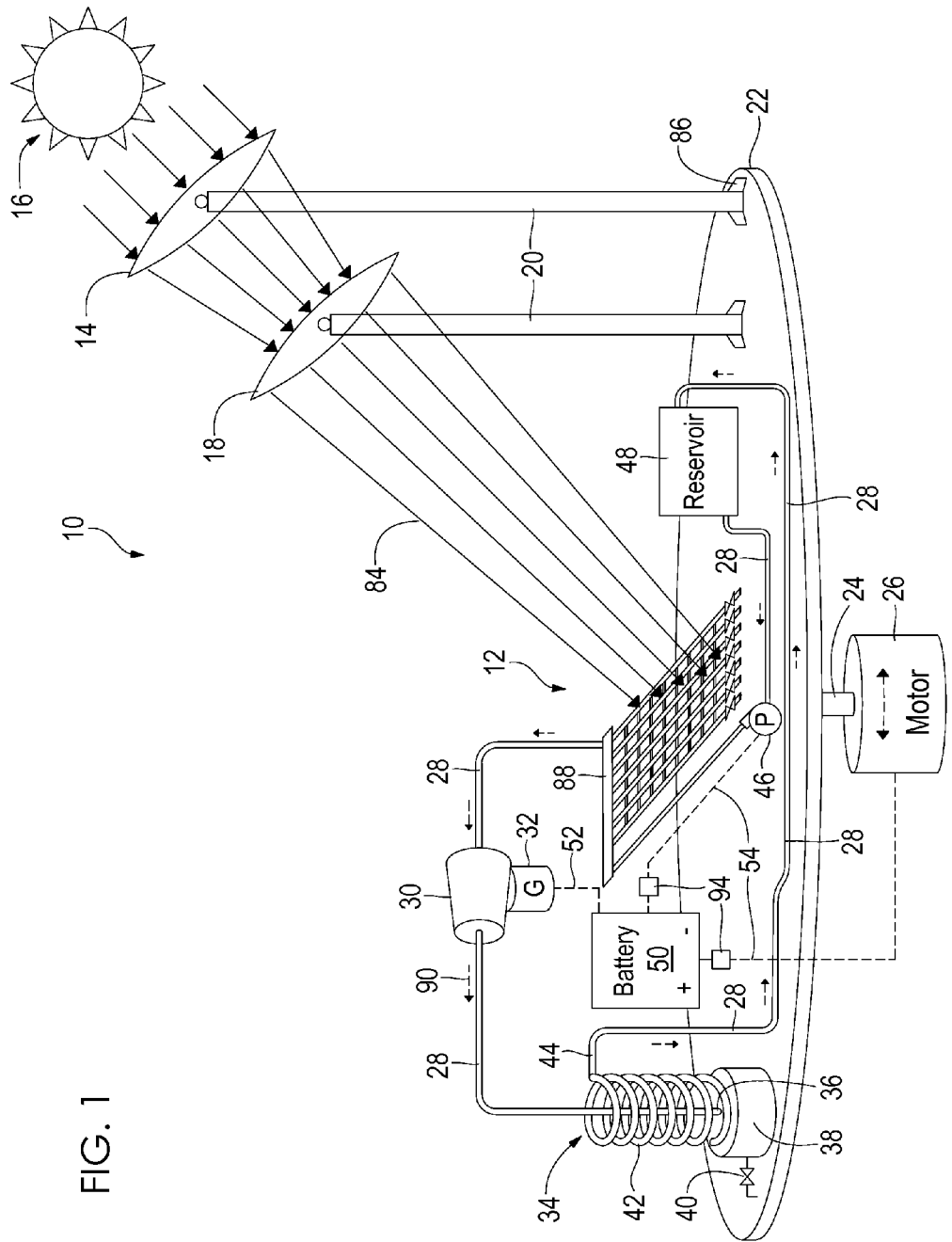
FIG. 1 is a perspective view of the present invention.

With regard to reference numerals used, the following numbering is used throughout the drawings.

10 present invention
12 steam grid system
14 first magnifying lens
16 sun
18 second magnifying lens
20 stanchion
22 rotating platform
24 attachment member
26 electrical motor
28 conduit
30 steam turbine
32 generator
34 condenser
36 inlet
38 reservoir
40 freshwater outlet
42 coil
44 outlet
46 pump
48 reservoir
50 battery
52 electrical connection
54 electrical connection 56 grid inlet conduit
58 manifold
60 primary grid conduit
62 secondary grid conduit
64 outlet valve
66 outlet spigot
68 ball
70 upper ball position sensor
72 lower ball position sensor
74 main control switch
76 electrical connections
78 electrical connections
80 electrical connections
82 electrical connections
84 solar rays
86 base
88 outlet end
90 direction arrow
92 fluid surface
94 voltage regulator

DETAILED DESCRIPTION OF THE PREFERRED EMBODIMENT

Figure 2:
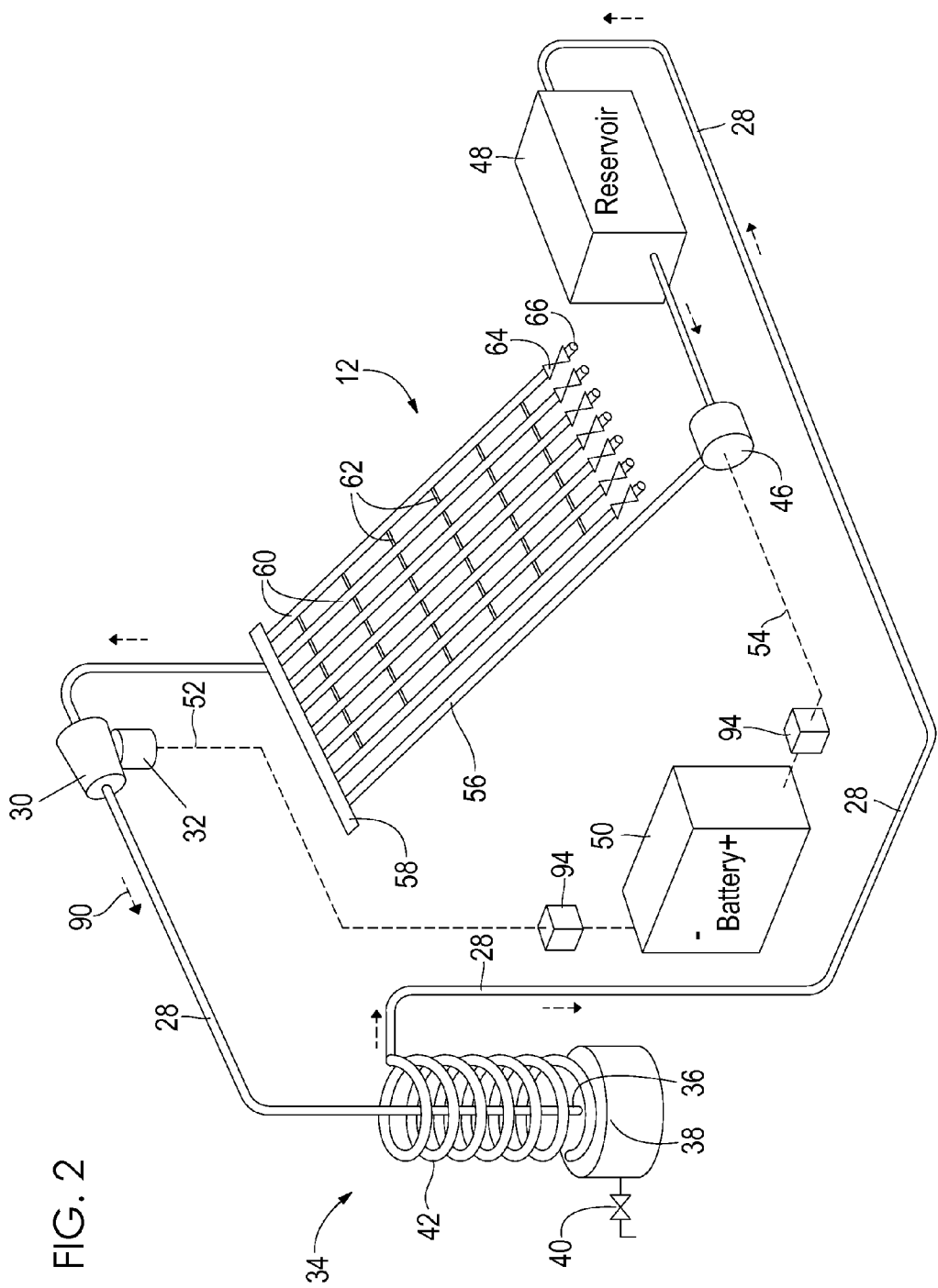
FIG. 2 is a perspective view of portions of the present invention.
Figure 3:
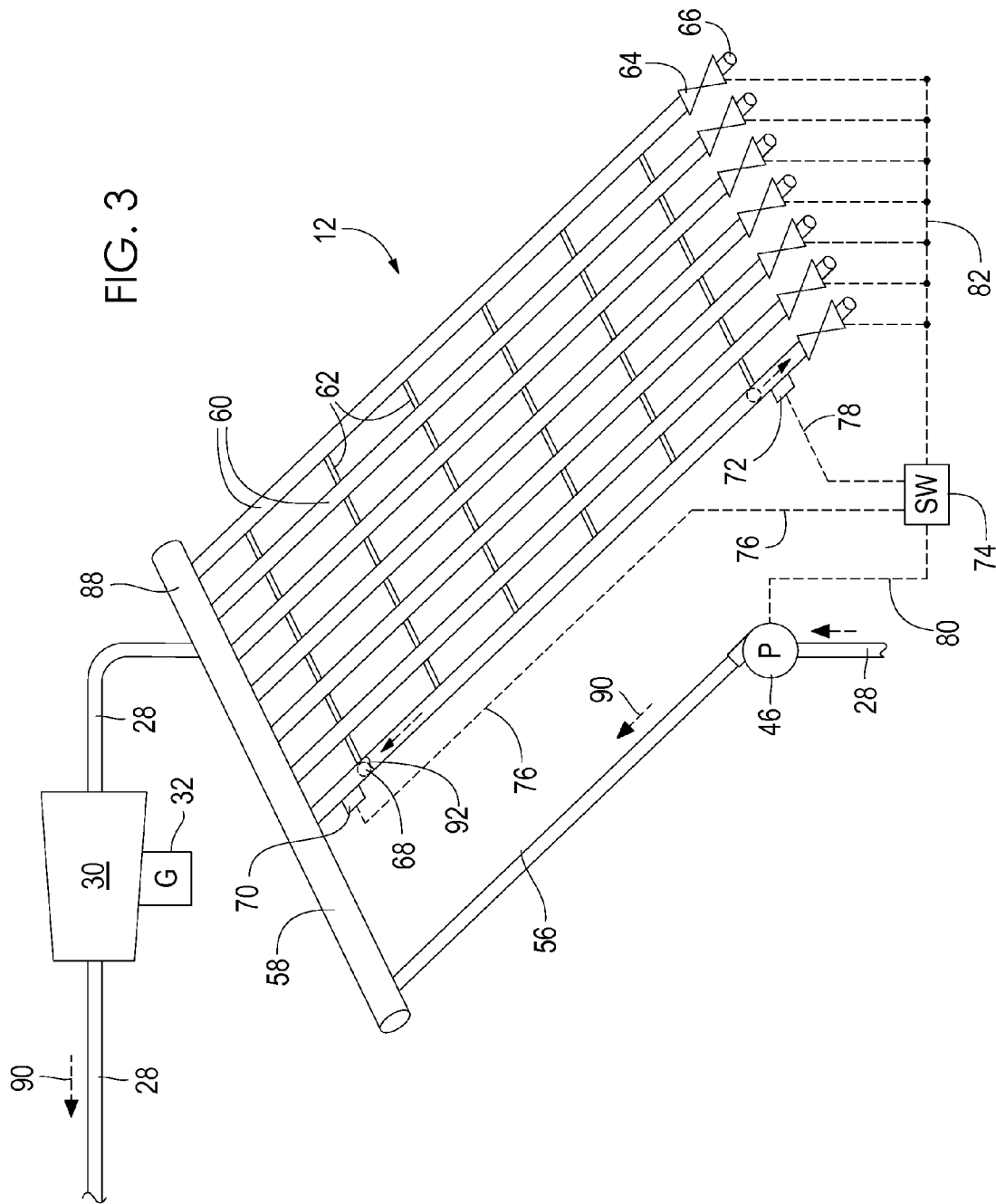
FIG. 3 is a perspective view of portions of the present invention.

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 3 illustrate the present invention wherein a method and apparatus for a desalinization system is disclosed.

Turning to FIG. 1, therein is shown the present invention 10 having a solar heated steam grid or boiler system 12 which would contain a fluid, such as salt water or the like, which is receiving concentrated solar energy in the form of solar rays 84 from a first magnifying lens 14 which is receiving energy from the sun 16. The solar heated steam grid 12 may comprise Pyrex glass, corning ware glass or metal tubes about two inches in diameter and about ¼ inch thick walls. Also shown is a second magnifying lens 18 (forming a compound lens using convex lens) in series with the first magnifying lens 14, which concentrate the solar rays and make the rays hotter and more powerful, and which also be used to capture solar energy from the sun 16 for transmission to the first magnifying lens 14 and then onto the steam grid 12 for increasing the solar energy transfer from the sun to steam grid 12. Each magnifying lens 14, 18 is supported on a stanchion 20 having a base 86 which is shown mounted onto a rotating platform 22 wherein the platform has an attachment member 24 for connection to an electrical motor 26 which turns the platform on which the entire present invention 10 is disposed so as to maintain the first and second magnifying lens 14, 18 substantially perpendicular to the sun 16 so that they receive maximum available solar energy from the sun. Platform 22 is capable of 0 to 360 degree rotation to be user selected by the operator depending on the angle of sun 16 relative to the present invention 10. Fluid is supplied to grid system 12 by supply pump 46 which receives fluid from fluid reservoir 48 which serves as the main supply of fluid for the present invention 10. Direction arrows 90 indicate in the standard manner the direction of fluid flow through the system of the present invention 10. Reservoir 48 could be an open or closed reservoir and it could be fed or supplied from a conventional water supply including a free standing body of water such as a lake, ocean or the like in which case accommodations would have to be provided to connect the water supply to the rotating elements of the present invention 10. The outlet end 88 of the steam grid 12 is shown elevated and connects through conduit 28 to a steam turbine 30 so that steam or vapor can be transmitted to the turbine. It can be seen that multiple conduits 28, i.e., the conduit is generally designated at 28, interconnect all of the inlets and outlets of the unit processes of the present invention 10 as would be done in the standard manner by one skilled in the art. A generator 32 is shown attached to steam turbine 30 and is driven by the turbine for generating electricity. The outlet of steam turbine 30 passes through conduit 28 to the condenser shown generally at 34. While a reflux type condenser 34 is illustrated, many types of conventional condensers could be used as would be done in the standard by one skilled in the art. Operation of condenser 34 will not be described in detail as it is well known in the art of condensers. The condenser 34 comprises an inlet conduit 36, a storage or condensate reservoir 38 for storing desalinated fluid, a freshwater or desalinated fluid outlet 40 for removing desalinated fluid from the system, along with a plurality of circular coils 42 and an outlet conduit 44 for conveying any remaining steam/vapor through conduit 28 to reservoir 48 which serves as a main supply reservoir and then to pump 46 which pumps make-up or raw water or fluid to conduit 28 as previously disclosed. Also shown is a storage battery 50, e.g., a 250 volt battery, with voltage regulator 94, which battery has a conventional input electrical connection 52 which receives supply electrical energy from generator 32; likewise, battery 50 supplies electrical energy to pump 46 and motor 26 using conventional electrical connections 54.

Turning to FIG. 2, therein is shown a portion of the present invention 10 having a solar heated steam grid system 12 which would contain a fluid, such as salt water or the like, which is receiving concentrated solar energy from the sun as previously disclosed. Fluid is supplied to grid system 12 by supply pump 46 which receives fluid from fluid reservoir 48 which serves as the main supply of fluid for the present invention 10. The outlet end of the steam grid 12 is shown elevated and connects through a conduit to a steam turbine 30 so that steam or vapor can be transmitted to the turbine. A generator 32 is shown attached to steam turbine 30 and is driven by the turbine for generating electricity. The outlet of steam turbine 30 passes through conduit 28 to the condenser shown generally at 34. The condenser 34 comprises an inlet conduit 36, a storage or condensate reservoir 38 for storing desalinated fluid, a freshwater or desalinated fluid outlet 40 for removing desalinated fluid from the system, along with a plurality of circular coils 42 and an outlet conduit for conveying any remaining steam/vapor through conduit 28 back to reservoir 48 which serves as a main supply reservoir and then to pump 46 which pumps make-up or raw water or fluid to conduit 28 as previously disclosed. Also shown is a storage battery 50 which has a conventional input electrical connection 52 which receives supply electrical energy from generator 32; likewise, battery 50 supplies electrical energy to pump 46 using conventional electrical connections 54. Voltage regulator 94 is also shown. The steam grid 12 has a main inlet conduit 56 extending from pump 46 and reservoir 48 which delivers fluid into a distribution manifold 58 which fluid is then distributed into a plurality of primary grid units 60 and a plurality of secondary crossing members 62 which grid units together form a grid with multiple conduits so as to efficiently capture the solar energy received from the sun. Each of the primary main grid units 60 has an outlet control 64 on its lower end which is expected to be an outlet valve which likewise has an outlet spigot 66 wherein highly concentrated salt waste can periodically be removed from the grid system 12. The solar heated steam grid 12 may comprise Pyrex glass, corning ware glass or metal tubes 60, 62 about two inches in diameter and about ¼ inch thick walls. Direction arrows 90 indicate in the standard manner the direction of fluid flow through the system of the present invention 10.

Turning to FIG. 3, therein is shown the steam grid 12 which has a main inlet conduit 56 from pump 46 and the reservoir which delivers fluid into a distribution manifold 58 which fluid is then distributed into a plurality of primary grid units 60 and a plurality of secondary crossing members 62 as previously disclosed. The solar heated steam grid 12 may comprise Pyrex glass, corning ware glass or metal tubes 60, 62 about two inches in diameter and about ¼ inch thick walls. Each of the primary main grid units 60 has an outlet control means 64 on its lower end which is expected to be an outlet valve which likewise has an outlet spigot means 66 wherein highly concentrated salt waste can be periodically removed from the grid system 12. Also shown is steam turbine 30 and generator 32 connected to the steam grid 12 by conduit 28 and then having the outlet of steam turbine 30 passing into conduit 28. Also shown is pump 46 receiving an inlet stream from conduit 28 wherein the outlet of pump 46 feeds into steam inlet conduit 56. It can be seen that primary grid conduit 60 is effectively sized to have a larger diameter than secondary grid conduit 66 so that the primary grid conduit can contain therein a complementarily sized hollow, floating steel ball 68 which will serve as a primary fluid level control means for operation and control of the present invention 10. Ball 68 floats on the surface of the fluid 92 contained in primary grid conduit 60. Ball 68 is prevented from entering the cross-connecting secondary grid conduit 66 because the ball has a larger diameter than the secondary grid; therefore, the ball is contained within the primary grid conduit 60. Hollow ball 68, which floats, travels up and down one member of the primary grid conduit 60 in order to allow the present invention 10 to operate according to the fluid level contained in primary grid conduit 60. Also shown is upper ball position sensor 70 and a lower ball position sensor 72 wherein each position sensor 70, 72 can sense when the hollow, steel ball 68 is in its vicinity. It is expected that the operation of the upper and lower ball position sensors 70,72 may utilize magnetic, electromagnetic, infrared, or density sensing or the like as would be done in the standard manner by one skilled in the art. When the ball 68 is near the upper ball position 70 the main control switch 74 cuts off the water supply into the grid system in order to allow the solar energy from the sun to heat the water in the grid system into a vaporized state and then to transmit that vapor through the steam turbine 30. Likewise, when the ball 68 drops into the vicinity of the lower ball position sensor 72 the system would open the outlet valve 64 and outlet spigot 66 to allow the grid system to drain so as to remove any left over highly concentrated salt solution for a predetermined period of time and then turn the water supply back on in order to provide additional unheated fluid into the system to refill the grid system 12 and start the heating cycle over again. Note that the upper and lower ball position sensors 70, 72 are electrically connected through wiring 76, 78, respectively, to main control switch 74; likewise, the main control switch 74 is electrically connected through electrical connections 80 to the pump 46 so that the pump can be controlled by the main control switch. Likewise, the main control switch 74 is electrically connected through wiring 82 to each of the outlet valve 64 so that the outlet valves can be controlled by the main control switch. Direction arrows 90 indicate in the standard manner the direction of fluid flow through the system of the present invention 10.

Continuing with additional explanation of the operation of the present invention 10, and with reference to FIGS. 1-3, the floating, hollow, steel ball 68 floats on the fluid surface 92 and moves up and down the primary grid conduit 60 in order to trigger upper or lower ball position sensors 70, 72. When ball 68 moves up and triggers the upper ball's position sensor 70, the fluid flow into the system is cut off by main switch 74 because the grid system is full to prevent overfilling or over-pressurization of grid system 12. As internal fluid is converted to vapor and the fluid level drops in primary grid conduit 60 due to the vaporization of the fluid, inside the grid system, the ball 68 moves downwardly and eventually triggers the lower ball position sensor 72 to let the highly concentrated salt water waste or residue out of the grid system for a predetermined period of time, for example five seconds, and then main switch 74 closes the outlet valve 64 and then turns on pump 46 to refill the grid system with additional raw supply fluid to be vaporized as the system is recycled.

I claim:

1. A method for desalinating fluid using solar energy from the sun, comprising the steps of:
   a) heating the fluid in a grid using solar energy, the grid having an upper end with first and second openings into said grid and a lower, closed end wherein the upper end is elevated above the lower end to permit vaporized fluid to be released from the grid, said grid comprising primary, parallel arranged and spaced conduits extending from the lower end to the upper end of said grid, and secondary conduits interconnecting said primary conduits;
   b) using a first magnifying lens for receiving the solar energy and directing the solar energy onto the grid, wherein the fluid in the grid is heated to a state of vaporization to produce vaporized fluid;
   c) transferring the vaporized fluid through the upper end first opening of the grid directly to a steam turbine;
   d) said steam turbine driving an electrical generator for generating electricity;
   e) condensing the vaporized fluid from the steam turbine in a condenser, the condenser having an inlet for the vaporized fluid, a first outlet for waste vaporized fluid, and a second outlet for desalinated fluid condensate;
   f) supplying fluid from a fluid reservoir to the grid through said upper end second opening, said fluid reservoir receiving waste vaporized fluid from said first outlet of the condenser;
   g) using an electrical pump for conveying fluid to the grid;
   h) rotating the first magnifying lens and the grid so that an energy efficient angular relationship is maintained between the first magnifying lens, the grid, and the sun;
   i) storing in a storage battery electricity from the electrical generator, wherein the storage battery supplies electricity to the electrical pump and for rotating the magnifying lens and the grid;
   j) controlling the fluid level in the grid to prevent overfilling or emptying of the grid using float balls in one of said primary conduits to maintain fluid levels in said primary conduits; and,
   k) removing waste periodically from the grid.

2. The method of claim 1, further comprising the step of providing a second magnifying less in series with the first magnifying lens and the sun.

3. The method of claim 1, wherein rotating the first magnifying lens and the grid further comprise the steps of:
   a) providing a rotatable platform upon which the first magnifying lens and the grid are disposed for rotating the first magnifying lens and the grid;

b) using an electrical motor for rotating the platform; and, c) wherein the electrical motor receives electricity from the storage battery.

4. The method of claim 1, wherein the condenser is a reflux condenser.

5. The method of claim 1, wherein controlling the fluid level in the grid further comprises the steps of:
   a) using an upper sensor for sensing when the float ball is proximate thereto, the upper sensor disposed proximate the upper end of said grid;
   b) using a lower sensor for sensing when the float ball is proximate thereto, the lower sensor disposed proximate the lower end of said grid;
   c) said electrical pump being turned on by the lower sensor when the float ball is proximate the lower sensor so that fluid is inlet into the grid; and,
   d) said electrical pump being turned off by the upper sensor when the float ball is proximate the upper sensor to prevent overfilling of the grid.

6. The method of claim 5, wherein removing waste from the grid further comprises the steps of:
   a) using a normally closed outlet valve on the lower end of each primary conduit;
   b) each outlet valve being periodically opened so that waste is removed from the grid to permit the grid to be cleaned; and,
   c) using a main control switch for controlling the operation of the outlet valves.

7. The method of claim 1, wherein the fluid comprises saltwater.

8. A method for desalinating water comprising the steps of:
   a) pumping salt water into a grid comprising a plurality of spaced, parallel, primary conduits, said grid having a manifold at an upper end of said grid for receiving and delivering said salt water into each primary conduit, said primary conduits each having a closed lower end with a normally closed outlet valve, and secondary conduits for providing communication between said primary conduits;
   b) directing solar energy onto said primary conduits for vaporizing said water therein, resultant water vapor rising into said manifold;
   c) transferring vaporized water from said manifold to an inlet of a steam turbine for operation of said steam turbine;
   d) said steam turbine driving a generator for producing electricity;
   e) condensing vaporized water exhaust from the steam turbine in a condenser;
   f) withdrawing waste vaporized water through a first outlet of said condenser;
   g) withdrawing desalinated water through a second outlet of said condenser;
   h) storing electricity produced by said generator in a battery;
   i) using electricity stored in said battery to operate equipment required by said method;
   j) controlling water levels in said primary conduits using a float ball in one of said primary conduits for preventing overfilling and for adding salt water when levels in said primary conduits reach a predetermined lower level; and,
   j) cleaning said primary conduits periodically by opening said primary conduit outlet valves.

* * * * *